United States Patent
Bailey et al.

(10) Patent No.: US 12,490,296 B2
(45) Date of Patent: Dec. 2, 2025

(54) CONFIGURING LIMITED CHANNEL BANDWIDTH USAGE FOR LOW-PRIORITY NETWORK DEVICES

(71) Applicant: T-Mobile USA, Inc., Bellevue, WA (US)

(72) Inventors: Christopher Bailey, Overland Park, KS (US); Ryan Dreiling, Shawnee, KS (US); Maksym Siryy, Overland Park, KS (US)

(73) Assignee: T-Mobile USA, Inc., Bellevue, WA (US)

( * ) Notice: Subject to any disclaimer, the term of this patent is extended or adjusted under 35 U.S.C. 154(b) by 319 days.

(21) Appl. No.: 18/355,271

(22) Filed: Jul. 19, 2023

(65) Prior Publication Data
US 2025/0031238 A1    Jan. 23, 2025

(51) Int. Cl.
*H04W 72/566*    (2023.01)
*H04W 8/18*    (2009.01)
(Continued)

(52) U.S. Cl.
CPC .......... *H04W 72/566* (2023.01); *H04W 8/18* (2013.01); *H04W 8/22* (2013.01); *H04W 28/20* (2013.01);
(Continued)

(58) Field of Classification Search
CPC ....... H04W 72/566; H04W 8/18; H04W 8/22; H04W 28/20; H04W 72/0457; H04W 60/00
See application file for complete search history.

(56) References Cited

U.S. PATENT DOCUMENTS 8,965,367 B1   2/2015  Bartlett et al.
9,832,678 B1  11/2017  Tandon et al.
(Continued)

FOREIGN PATENT DOCUMENTS

CN     116419170 A     7/2023
KR     101514027 B1    4/2015
WO     2021155547 A1   8/2021

OTHER PUBLICATIONS

International Search Report and Written Opinion from PCT App. No. PCT/US2024/038631 mailed Nov. 8, 2024, 10 pages.
(Continued)

*Primary Examiner* — Khoa Huynh
(74) *Attorney, Agent, or Firm* — Perkins Coie LLP

(57) ABSTRACT

A telecommunication network limits bandwidth usage for devices associated with lower service priority levels, thus conserving physical resources for use by devices with higher service priority levels. Low priority devices can include mobile virtual network operator (MVNO) devices, roaming devices, Internet of Things (IoT) devices, and/or the like. The telecommunication network enforces the limited bandwidth usage if a low priority device is capable of using channel subdivisions (e.g., bandwidth parts (BWPs)), and this device capability is communicated during a UE capability exchange that occurs during a registration process. Core network functions provide a policy that specifies a limited channel bandwidth for a capable low-priority device to a network node of the telecommunication network to which the wireless device is communicably coupled. The network node configures the wireless device to use the limited channel bandwidth according to the policy.

20 Claims, 5 Drawing Sheets

(51) Int. Cl.
*H04W 8/22* (2009.01)
*H04W 28/20* (2009.01)
*H04W 72/0457* (2023.01)
*H04W 60/00* (2009.01)

(52) U.S. Cl.
CPC ........ *H04W 72/0457* (2023.01); *H04W 60/00* (2013.01)

(56) References Cited

U.S. PATENT DOCUMENTS

| | | |
|---|---|---|
| 10,764,789 B2 | 9/2020 | Qiao et al. |
| 11,006,323 B2 | 5/2021 | Kim et al. |
| 11,032,393 B2 | 6/2021 | Forsman et al. |
| 11,102,696 B1 * | 8/2021 | Chockalingam ...... H04M 15/66 |
| 11,570,793 B2 | 1/2023 | Shaw |
| 2019/0053104 A1 * | 2/2019 | Qiao ................... H04L 41/0895 |
| 2023/0189309 A1 * | 6/2023 | Ying ..................... H04W 72/51 |

OTHER PUBLICATIONS

Ericsson, "FL summary #2 on reduced maximum UE bandwidth for RedCap", from R1-2106000, 3GPP TSG RAN WG1 Meeting #105-e, May 24, 2021. 41 pages.

* cited by examiner

CONFIGURING LIMITED CHANNEL BANDWIDTH USAGE FOR LOW-PRIORITY NETWORK DEVICES

BACKGROUND

A wireless telecommunication network can be managed by a network operator to provide communication services to a diverse population of wireless devices used by subscribers and non-subscribers. The wireless telecommunication network provides its communication services via a finite amount of resources, including physical resources relating to radio spectrum and bandwidth. To reliably and satisfactorily provide communication services, the wireless telecommunication network needs to distribute and allocate the finite amount of resources among its diverse population.

BRIEF DESCRIPTION OF THE DRAWINGS

Detailed descriptions of implementations of the present invention will be described and explained through the use of the accompanying drawings.

Figure 1:
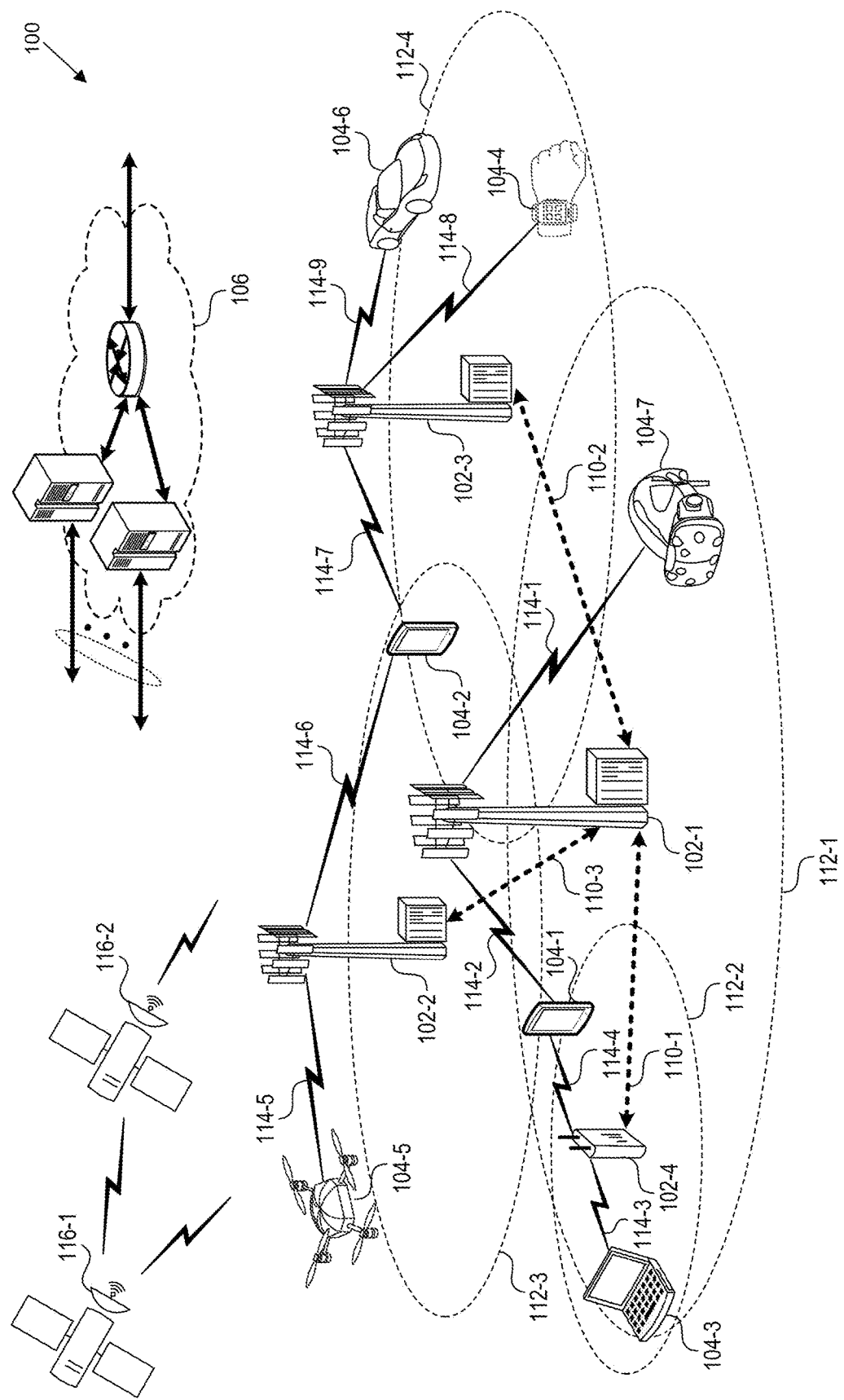
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The present disclosure relates to prioritizing channel bandwidth usage among a diverse populations of devices on a wireless telecommunication network. In particular, example embodiments described herein relate to limiting usage of physical bandwidth resources at a radio access network of the wireless telecommunication network by devices that are identified as low priority compared to other devices. By doing so, some portion of the physical bandwidth resources can be reserved for usage by high-priority devices, so that the high-priority devices can enjoy a quality of communication services that is minimally affected by congestion or saturation of the wireless telecommunication network.

According to some embodiments, the technical solutions of the present disclosure can be applied to wireless devices that are equipped to use only part of a total channel bandwidth specified for the wireless devices to access and use a wireless telecommunication network. In a 5G telecommunication network, bandwidth parts (BWPs), or a subset of contiguous physical resource blocks within a carrier or channel bandwidth, represent subdivisions of the carrier or channel bandwidth and can be configured for usage by wireless devices, for example as defined according to 3rd Generation Partnership Project (3GPP) Technical Specification (TS) 38.211. A wireless device capable of BWP switching (BWP-S) can be configured to use, for example, a 20 MHz portion of a full 100 MHz channel bandwidth of the n41 frequency band instead of the full 100 MHz channel bandwidth. While the description included in the present disclosure may refer to BWPs, it will be understood that non-5G implementations that may refer to carrier subdivisions/sidebands, channel bandwidth parts/portions/divisions, and/or the like under different terminology are included within the scope of the present disclosure.

In the disclosed solutions, a wireless telecommunication network can leverage device capabilities for BWP-S to configure low priority devices to use limited BWPs while permitting high priority devices to use a full channel bandwidth (or a greater number of BWPs). In example embodiments, wireless devices of a wireless telecommunication network can be identified as low priority according to factors including user type, device type, network usage type, and/or the like. For example, while many wireless devices on a wireless telecommunication network belong to subscribers or customers of a network operator that operates the wireless telecommunication network, the wireless telecommunication network can additionally serve other wireless devices, including devices that are roaming from another wireless telecommunication network or devices that are not subscribers/customers of the network operator (e.g., devices associated with a mobile virtual network operator (MVNO)). These other wireless devices may be assigned a lower priority for service compared to the wireless devices belonging to subscribers/customers of the network operator; for example, the network operator may prefer to (or be obligated to) provide a better experience and service to its actual subscribers/customers. Some devices on the wireless telecommunication network can be designated as low priority based on their device type or type of network usage; for example, Internet of Things (IoT) and messaging devices (e.g., utility meters, environmental sensors) may be prioritized lower than user devices (e.g., smartphones, tablets, laptops).

Therefore, example embodiments provide solutions that improve the operation of a wireless telecommunication network and the quality of communication services provided to a large population of devices on the wireless telecommunication network. By configuring channel bandwidth usage commensurate to each device's service quality needs, these finite resources of the wireless telecommunication network are better distributed across the network's diverse population of devices. The solutions described herein extend load and resource management schemes beyond network data throughput and traffic to physical access resources. Negative effects experienced by devices on the network associated with network congestion and overload can be minimized.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Example Wireless Communications Systems

FIG. 1 is a block diagram that illustrates a wireless telecommunication network 100 ("network 100") in which aspects of the disclosed technology are incorporated. For example, the network 100 implements systems that can prioritize devices on the network 100 based on intrinsic or base characteristics, determine limited channel bandwidth usage by the devices based on assigned priorities, and configure the devices to use respective bandwidth parts/portions/subdivisions. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1, 104-2, 104-3, 104-4, 104-5, 104-6, and 104-7 (referred to individually as "wireless device 104" or collectively as "wireless devices 104") and a core network 106. The wireless devices 104 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, internet protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The coverage area 112 for a base station 102 can be divided into sectors making up only a portion of the coverage area (not shown). The network 100 can include base stations of different types (e.g., macro and/or small cell base stations). In some implementations, there can be overlapping coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device can be referred to as a user equipment (UE), a customer premises equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like. Wireless devices of the network 100 can further include non-subscriber devices, such as devices roaming on the network 100 and are subscribed to a different network, or devices associated with a mobile virtual network operator (MVNO) or secondary operator of the network 100. In connection being non-subscriber devices, these wireless devices can be associated with lower needs or requirements for communication service quality, such as lower throughput, lower data usage, and/or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites, such as satellites 116-1 and 116-2, to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service (QoS) requirements and multi-terabits-per-second data transmission in the era of 6G and beyond, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

Example 5G Core Network Functions

Figure 2:
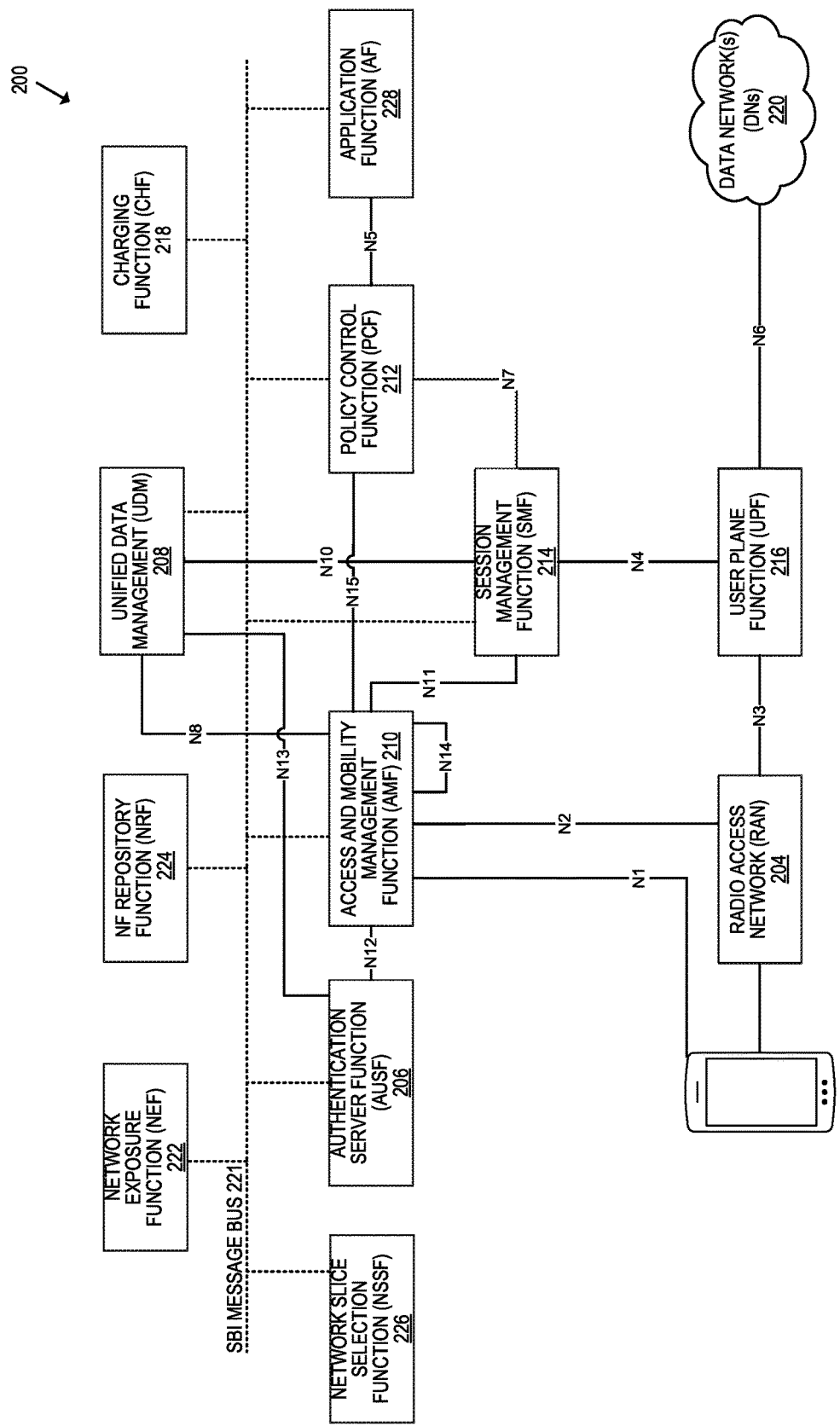
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility Management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNS) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) message bus 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, and service-level agreements and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS) and can provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208 and then provides the appropriate policy rules to the control plane functions so that they can enforce them. The SCP (not shown) provides a highly distributed multi-access edge compute cloud environment and a single point of entry for a cluster of NFs, once they have been successfully discovered by the NRF 224. This allows the SCP to become the delegated discovery point in a datacenter, off-loading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework that, along with the more typical QoS and charging rules, includes network slice selection, which is regulated by the NSSF 226.

Example Implementations for Priority-Based Channel Bandwidth Usage

Example implementations described herein provide solutions that configure wireless devices on a network to use an amount of channel bandwidth that is commensurate with the service quality needs/requirements of the wireless devices, which can be based on user/subscriber type (e.g., subscriber vs. non-subscriber), device type, network usage type, and/or the like. The example implementations described herein intelligently allocate physical access resources for the wireless telecommunication network among a diverse set of devices, thus extending network load/resource management to the access domain of the wireless telecommunication network (e.g., the RAN 204 in FIG. 2). According to the example implementations, a wireless telecommunication network, and cells of its radio access network, can avoid congestion, saturation, overloading, and the like.

Figure 3A:
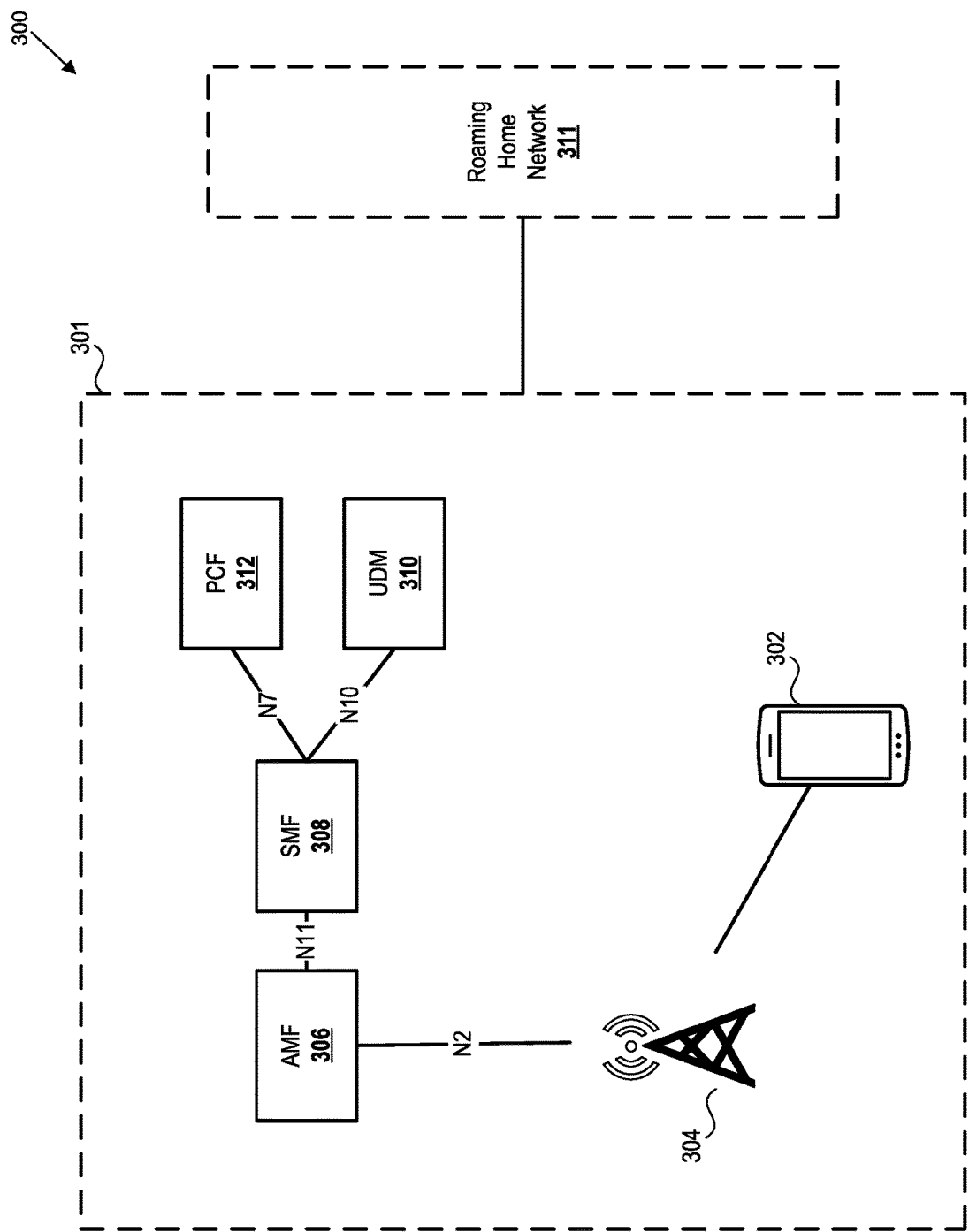
FIG. 3A is a block diagram that illustrates an example system to configure devices associated with low service priorities for limited channel bandwidth usage.

FIG. 3A is a block diagram that illustrates an example system for configuring network devices associated with low service priorities to use limited channel bandwidth. In the system 300, a telecommunication network 301 includes a wireless device or user equipment (UE) 302 that is connected to a base station 304 in order to access and use the telecommunication network 301. The base station 304 is one of a plurality of base stations forming a radio access network of the wireless telecommunication network and interfaces with the UE 302 via transmission specified in relation to frequency bands having channel or carrier bandwidths. According to example embodiments, the base station 304 is able to configure the medium or manner by which the UE 302 interfaces with the base station 304, for example, including specifying a BWP or bandwidth subdivision of a channel, carrier, or frequency band to be used by the UE 302 for a downlink (DL) or an uplink (UL) transmission. The base station 304 manages other aspects of the UE's access and use of the wireless telecommunication network 301, including transmission scheduling, handovers to other base stations, and/or the like. During its use of the telecommunication network 301, the UE 302 may be connected to different base stations over time. For simplicity, the description may refer to a single base station; however, it will be understood that throughout various processes and methods, different base stations may be involved depending on a mobility of the UE 302.

As discussed, the base station 304 (or generally, the radio access network) is coupled to a core network of the telecommunication network 301, which includes various core network functions (including those described with FIG. 2) for delivering the communication services of the network 301, operating and managing the network 301, and the like. In particular, the telecommunication network 301 at its core network includes an AMF 306, an SMF 308, a UDM 310, and a PCF 312, and these network functions operate to deliver policies to the base station 304 (or generally, the radio access network) for configuring the UE's access and use of the telecommunication network 301. In some embodiments, the base station 304 is specifically coupled with an AMF 306 of the core network (e.g., via an n2 interface), which is further coupled (e.g., via an n11 interface) with an SMF 308 that manages aspects of the UE's session with the wireless telecommunication network 301 using information that the SMF 308 collects or obtains from the UDM 310 (e.g., via an n10 interface) and the PCF 312 (e.g., via an n7 interface). In particular, the SMF 308 can collect or obtain subscriber information associated with the UE 302 from the UDM 310, and the SMF 308 can provide or indicate the subscriber information to the PCF 312 to obtain a network policy for the UE 302. The network functions illustrated in FIG. 3A are responsible for determining and delivering, to the base station 304, policies that specifically manage the UE's access and use of the wireless telecommunication network 301; according to example embodiments, these policies specify limited channel bandwidth(s) for the UE 302 if the UE 302 is assigned with a low service priority.

In some embodiments, the UE 302 is assigned with a low service priority based on the subscriber information associated with the UE 302; for example, the UE 302 being associated with a roaming subscriber or an MVNO subscriber can cause the UE 302 to be assigned with a low service priority. For a UE 302 associated with a roaming subscriber (e.g., the UE 302 is a roaming device), the telecommunication network 301 is a visiting network for the UE 302. As illustrated, the system 300 can include a roaming home network 311 that is a different network than the telecommunication network 301, and the roaming home network 311 can be operated by a network operator that is different than the operator for the telecommunication network 301. The core network of the telecommunication network 301 is able to determine that the UE 302 is not a subscriber of the network operator of the telecommunication network 301 (e.g., based on the UDM 310 informing the SMF 308 of a lack of subscriber information associated with the UE 302), and the core network can communicate with the roaming home network 311 for the UE 302 to obtain service quality information and other information needed for the UE 302 to roam on the telecommunication network 301 (e.g., settlement information, payment information). In particular, the service quality information can include predetermined or contractual (e.g., service level agreements (SLAs)) minimums for data throughput and other communication quality metrics, including bandwidth usage in some embodiments. In some examples, the core network includes a security edge protection proxy (SEPP) function via which the telecommunication network 301 interfaces with the roaming home network 311 to obtain roaming information for the UE 302. In some examples, the telecommunication network 301 interfaces with the roaming home network 311 via the PCF 312 to obtain roaming information for the UE 302.

In some examples, the UE 302 is associated with an MVNO subscriber, which is indicated in subscriber information stored in the UDM 310. The subscriber information stored in the UDM 310 that identifies the MVNO subscriber for the UE 302 can similarly indicate service quality information, such as data throughput/speeds/volume and other communication metrics that may be part of an MVNO SLA.

In some embodiments, the telecommunication network 301 is configured to implement network slices to thereby provide enhanced control over its wireless devices. The telecommunication network 301 can assigned UEs to different network slices and handle network services for the UEs according to slice-level requirements, conditions, or minimums. In some embodiments, the telecommunication network 301 associates a priority level to the network slices, and the core network can assign a UE 302 with a low service priority according to the priority level of a network slice to which the UE 302 belongs. The core network can include a NSSF and/or other components that manage the assignment of the UE 302 to the particular network slice of the telecommunication network 301 and the determination of policies for the UE 302 based on the network slice on which the UE 302 operates.

Figure 3B:
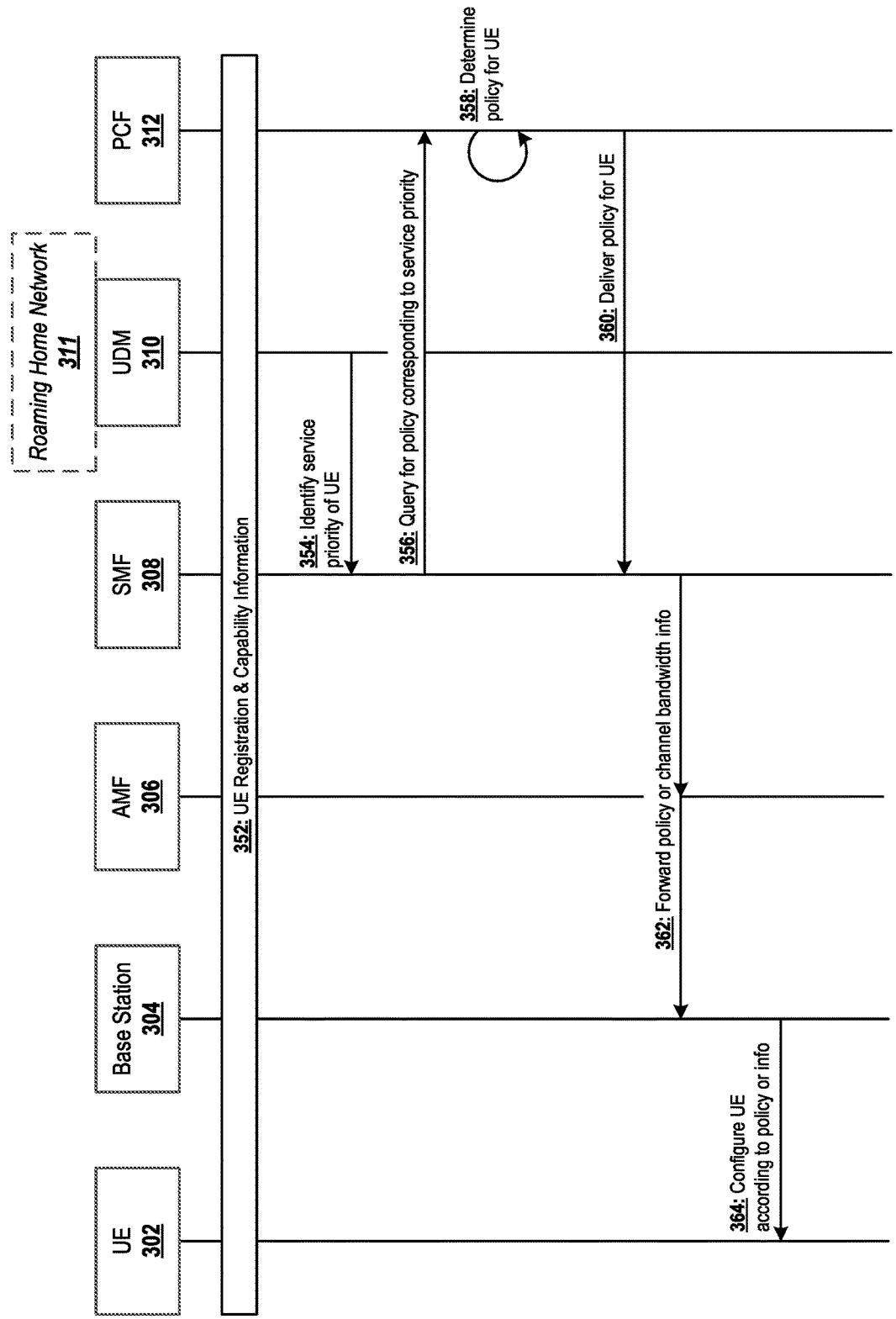
FIG. 3B is a sequence diagram that illustrates example operations performed to configure devices associated with low service priorities for limited channel bandwidth usage.

Turning now to FIG. 3B, a sequence diagram is provided to illustrate example operations performed to configure devices associated with low service priorities for limited channel bandwidth usage. In the illustrated embodiment, the example operations illustrated in FIG. 3B are implemented by the components of the system 300 illustrated in FIG. 3A.

At operation 352, the UE 302 registers with the telecommunication network 301 via the base station 304. For example, the UE 302 transmits a registration request message to the base station 304, which performs a registration process in which the base station 304 selects an AMF 306 to use for management of the UE 302. During registration, the UE 302 provides device capability information to the base station 304, the device capability information identifying certain network features that the UE 302 is capable of. In particular, the device capability information indicates whether or not the UE 302 is capable of BWP switching, or capable of using a subdivision or portion of a channel bandwidth specified by the base station 304 for the UE 302. The base station 304 receives the device capability information and provides the device capability information to the core network (e.g., at least via the AMF 306) such that the core network can use the device capability information to manage the UE's access and use of the telecommunication network 301.

According to example embodiments, the technique demonstrated in FIG. 3B proceeds if the device capability information provided by the UE 302 indicates that the UE 302 is capable of BWP switching or using channel bandwidth subdivisions/portions, thereby indicating that the UE's channel bandwidth can be limited. Conversely, in some embodiments, the UE 302 may continue about normal or non-limited use of the telecommunication network 301 if the device capability information instead indicates that the UE 302 is only capable of using a full channel bandwidth. In some embodiments, in response to the device capability information indicating that the UE 302 is only capable of using a full channel bandwidth, the network operator of the telecommunication network 301 can (e.g., via the telecommunication network 301, via other networks such as a Wi-Fi network) transmit an over-the-air (OTA) update to the UE 302 to provide the BWP switching capability to the UE 302, or to switch a device configuration of the UE 302 to enable BWP switching capability. Following the OTA update, the remaining technique of FIG. 3B can be performed to limit the UE's channel bandwidth usage according to a service priority for the UE.

At operation 354, a UDM 310 or roaming home network 311 identifies the UE 302 as a low-priority device. In some examples, the UE 302 is a low-priority device based on being operated by a roaming subscriber. Accordingly, the UDM 310 can first identify that the UE 302 is not associated with a subscriber of the network operator of the telecommunication network, upon which the telecommunication network 301 can interface with a roaming home network 311 of the UE 302 according to a roaming flow or process to establish/register the UE 302 as a roaming device on the telecommunication network 301. In some examples, the UE 302 is a low-priority device based on being a subscriber to an MVNO of the telecommunication network 301, and the UDM 310 stores subscriber information that indicates the UE 302 being a subscriber to the MVNO. In some examples, the UE 302 is a low-priority device based on a device type (e.g., an IoT device, a messaging device), which can be indicated to the UDM 310 during registration, stored in the UDM 310 based on a prior use of the telecommunication network 301 by the UE 302, and/or the like. In some examples, the UE 302 is a low-priority device based on belonging to a low-priority network slice of the telecommunication network 301. Accordingly, a NSSF or other slice-related network function of the telecommunication network 301 can identify the UE 302 as a low-priority device, or the UDM 310 identifies the UE 302 as a low-priority device via the NSSF or other slice-related network function. In some examples, the UDM 310 stores historical usage information associated with the UE 302 based on prior use of the telecommunication network 301 by the UE 302; a computing system (e.g., a network function, a separate analysis server) can analyze the prior use of the network and determine whether the UE 302 should be handled with a low or high service priority in its subsequent uses of the network. This analysis and/or determination can be stored in the UDM 310, so that the UDM 310 can identify the UE 302 as a low-priority device at 354.

The identification of the UE 302 as a low-priority device by the UDM 310 (or roaming home network 311 in certain examples, or by another network function such as the NSSF) may be at request from the SMF 308. For example, in connection with the registration of the UE 302 with the telecommunication network 301, the SMF 308 is configured to obtain a policy to enact for the UE 302 based on querying the UDM 310, the PCF 312, and/or other network functions regarding the service priority of the UE 302.

At operation 356, the SMF 308 queries for a policy for the UE 302 from the PCF 312. In its query, the SMF 308 can indicate the service priority of the UE 302 that the SMF 308 obtained (e.g., from the UDM 310). As such, the PCF 312 can determine and provide a policy that corresponds to the service priority of the UE 302. In particular, at operation 358, the PCF 312 can determine a policy that specifies a limited channel bandwidth for the UE 302 based on the service priority of the UE 302 being a low priority.

In some embodiments, the limited channel bandwidth is defined with respect to pre-determined or pre-defined BWPs for a channel, carrier, or frequency band that is available for the UE 302 to use for access to the telecommunication network. For example, the PCF 312 can determine a number of BWPs for the UE 302 to use. In some embodiments, the PCF 312 can determine the BWPs or subdivisions of the channel, carrier, or frequency band, and can specify a pre-defined subdivision or BWP scheme. In some embodiments, the policy specifies a time period or operational conditions for the limited channel bandwidth. For example, the policy can require that the UE 302 initially use one or more BWPs for a first time period, and after the first time period, the policy permits the UE 302 to use a full channel bandwidth (or an increased number of BWPs). As another example, the policy can require that the UE 302 use BWPs for a first type of communication service or application (e.g., mobile broadband) and that the UE 302 use a full channel bandwidth for a second type of communication service or application (e.g., telephone calls, Voice over New Radio (VONR)). As yet another example, the policy simply specifies that the UE 302 use BWP-S, which includes techniques for alternating between BWPs and full channel bandwidth over time based on the present communication needs of the UE 302. These and other examples of limited bandwidth assignment based on service level agreement (e.g., a roaming service level, a MNVO service level) and/or based on device type can be specified within the policy determined by the PCF 312.

The limited channel bandwidth usage can be one of a plurality of aspects included in the policy. As discussed, limited channel bandwidth usage embodies an extension of load/resource management to the access domain of the telecommunication network, and the policy can include other load/resource management parameters relating to data traffic throughput and/or the like, such as a minimum bitrate throughput or data network latency.

At operation 360, the PCF 312 delivers the policy for the UE 302 to the SMF 308 in response to the query by the SMF 308, and upon receiving the policy, the SMF 308 begins implementing the policy for the UE 302 (e.g., for at least a current session of the UE 302 with the telecommunication network 301). At operation 362, the SMF 308 forwards the policy (or at least a portion of the policy relating to the limited channel bandwidth usage) to the base station 304 in order for the UE 302 to be configured to use the limited channel bandwidth. The SMF 308 can forward the policy to the base station 304 via the AMF 306. The base station to which the SMF 308 forwards the policy is the base station to which the UE 302 is currently connected, which can be the same base station involved during previous operations or another base station to which the UE 302 is handed over.

At operation 364, the base station 304 configures the UE 302 for limited channel bandwidth usage via a RRC message according to the policy forwarded to the base station 304. In some embodiments, the base station 304 configures the UE 302 by transmitting a radio resource configuration (RRC) message to the UE 302, with the RRC message specifying BWPs or channel subdivisions to be used by the UE 302 (and/or other parameters including time periods or conditions for alternating or switching between BWPs). Thus, at operation 364, the UE 302 receives a message from the base station 304 that includes information specifying a limited channel bandwidth usage and implements the information such that the UE 302 transmits signals to and/or receives signals from the base station 304 according to the limited channel bandwidth.

In some embodiments, the techniques demonstrated in FIG. 3B can continue over time such that channel bandwidth usage of the UE 302 can be re-configured repeatedly. For example, the service priority assigned to the UE 302, or at least the channel bandwidth corresponding to the service priority assigned to the UE 302, can be dynamic over time. In some examples, low-priority UEs 302 can enjoy increased channel bandwidth usage at a later point in time when the telecommunication network (e.g., at its radio access network) is experiencing relatively low or decreased levels of usage or occupancy. At such a later point in time, for example, the core network functions of the telecommunication network 301 can determine that the access network is experiencing low occupancy levels, determine updated policies that specify increased channel bandwidth usage (e.g., a full channel bandwidth, an increased number of BWPs, larger BWPs) for low-priority UEs previously configured with limited channel bandwidth usage, and enforce the updated policies upon the low-priority UEs. Conversely, in periods of relatively high or increased occupancy, the telecommunication network (e.g., the core network functions and/or the base station(s)) can further limit the channel bandwidth usage of low-priority UEs. For reconfiguration of channel bandwidth usage for the UEs, different AMFs and base stations can be involved depending on the mobility of the UEs.

The techniques demonstrated in FIG. 3B are also applied for UEs with high service priority (or devices assigned with a primary service-priority level relative to a secondary service-priority level). For example, the UDM 310 can identify to the SMF 308 that a UE has a high service priority, which can be based on the UE being associated with a subscriber of the network operator of the telecommunication network, based on the UE being associated with a non-roaming or home subscriber, based on the UE being a high-usage device (e.g., a smartphone), and/or the like. The SMF 308 can then query for and obtain a policy determined by the PCF 312 that corresponds to the high service priority of the UE. For example, the policy specifies a full channel bandwidth for the UE, an increased number of BWPs available to the UE (relative to a low-priority UE), a subdivision scheme with larger BWPs (relative to those for a low-priority UE), less stringent thresholds or conditions for switching to BWP usage, and/or the like. This policy or information for the high-priority UE can then be forwarded to the base station 304 which configures the high-priority UE accordingly.

Thus, via the interactions and processes shown in FIG. 3B, a telecommunication system can configure wireless devices or UEs on a wireless telecommunication network to use a channel bandwidth (e.g., a full channel bandwidth, one or more subdivisions or parts of the full channel bandwidth) that corresponds to respective service quality needs. The telecommunication system retrieves and delivers priority-based policies to base stations of the wireless telecommunication network, which then configure the wireless devices or UEs according to the priority-based policies which specify the limited channel bandwidth.

The above-described embodiments include a network node receiving a policy for a low-priority UE from a core network of a telecommunication network, with the policy specifying a limited channel bandwidth for the low-priority UE. In other example embodiments, the network node locally determines that a wireless device is a low-priority UE (e.g., based on a device type determined by the network node during registration of the wireless device) and configures the wireless device to use a limited channel bandwidth determined by the network node. The network node can then report this resource limitation on the wireless device to the core network of the telecommunication network, such that this resource limitation can continue to be enforced when the wireless device is mobile and connects to other network nodes.

In other example embodiments, the network node receives an indication that a wireless device has a low service priority from the core network (e.g., via a policy) and locally determines the limited channel bandwidth to enforce upon the wireless device according to the low service priority. The network node can locally determine the limited channel bandwidth for the wireless device based on the channel bandwidth configuration or usage for other wireless devices connected to the telecommunication network via the network node.

Example Computing Systems

Figure 4:
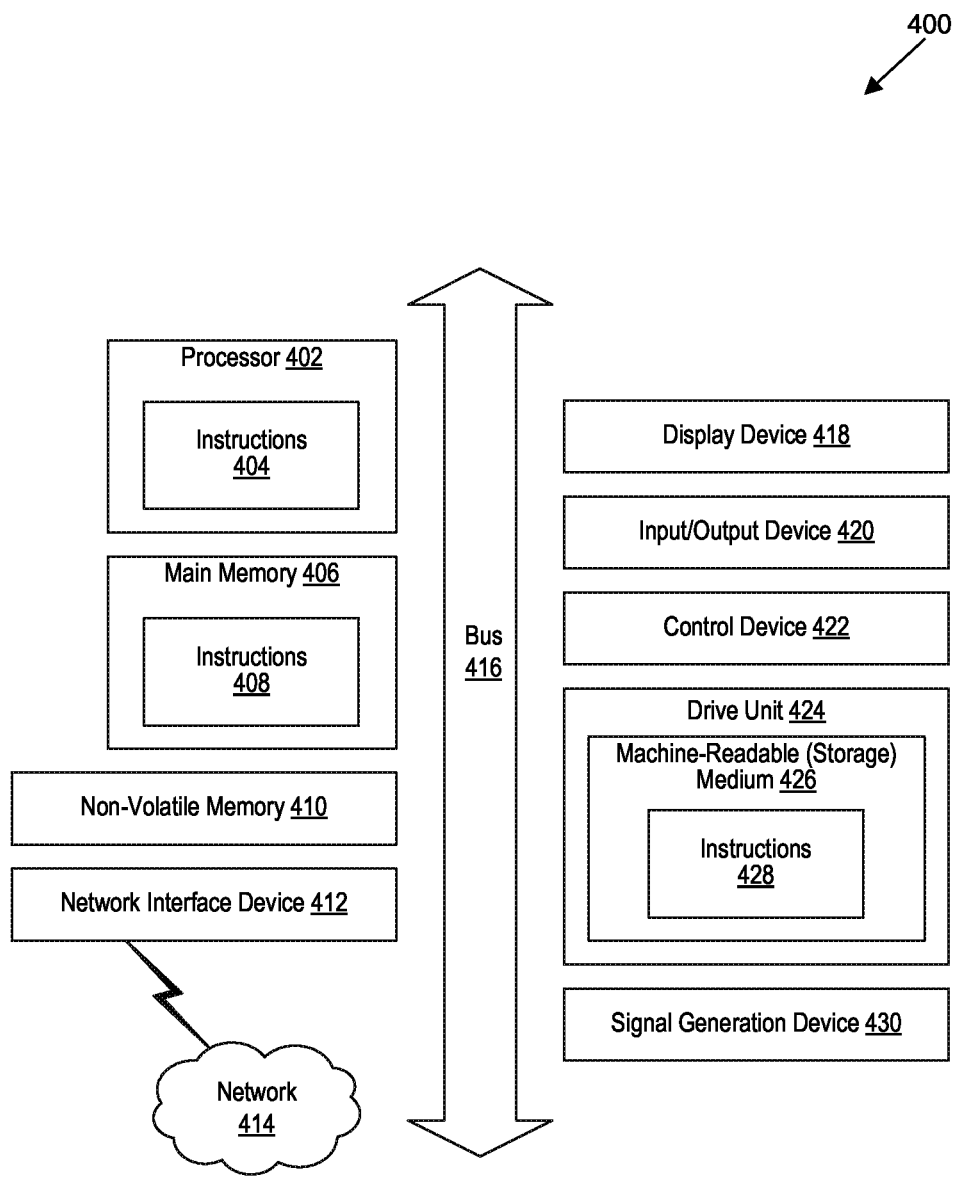
FIG. 4 is a block diagram that illustrates an example of a computer system in which at least some operations described herein can be implemented.

FIG. 4 is a block diagram that illustrates an example of a computing system 400 in which at least some operations described herein can be implemented. In some examples, the computing system 400 is embodied by a wireless device or UE that is configured to use a limited channel bandwidth by a telecommunication network and uses the limited channel bandwidth to access the telecommunication network. In some examples, the computing system 400 is embodied by a network node (e.g., a base station) of a telecommunication network that receives a policy for a wireless device that specifies a limited channel bandwidth or identifies a low service priority for the wireless device and configures the wireless device according to the policy. In some examples, the computing system 400 is embodied by one or more core network functions that determine policies for wireless devices and cause the wireless devices to be configured to use channel bandwidths corresponding to the service priorities of the wireless devices.

As shown, the computing system 400 can include: one or more processors 402, main memory 406, non-volatile memory 410, a network interface device 412, a video display device 418, an input/output device 420, a control device 422 (e.g., keyboard and pointing device), a drive unit 424 that includes a machine-readable storage medium 426, and a signal generation device 430 that are communicatively connected to a bus 416. The bus 416 represents one or more physical buses and/or point-to-point connections that are connected by appropriate bridges, adapters, or controllers. Various common components (e.g., cache memory) are omitted from FIG. 4 for brevity. Instead, the computing system 400 is intended to illustrate a hardware device on which components illustrated or described relative to the examples of the figures and any other components described in this specification can be implemented.

The computing system 400 can take any suitable physical form. For example, the computing system 400 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 400. In some implementations, the computing system 400 can be an embedded computing system, a system-on-chip (SOC), a single-board computing system (SBC), a distributed system such as a mesh of computing systems, or one or more cloud components in one or more networks. Where appropriate, one or more computing systems 400 can perform operations in real time, in near real time, or in batch mode.

The network interface device 412 enables the computing system 400 to mediate data in a network 414 with an entity that is external to the computing system 400 through any communication protocol supported by the computing system 400 and the external entity. Examples of the network interface device 412 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 406, non-volatile memory 410, machine-readable medium 426) can be local, remote, or distributed. Although shown as a single medium, the machine-readable medium 426 can include multiple media (e.g., a centralized/distributed database and/or associated caches and servers) that store one or more sets of instructions 428. The machine-readable storage medium 426 can include any medium that is capable of storing, encoding, or carrying a set of instructions for execution by the computing system 400. The machine-readable medium 426 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 410, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 404, 408, 428) set at various times in various memory and storage devices in computing device(s). When read and executed by the processor 402, the instruction(s) cause the computing system 400 to perform operations to execute elements involving the various aspects of the disclosure.

REMARKS

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. A network node for a telecommunication network, the network node comprising:
   at least one hardware processor; and
   at least one non-transitory memory storing instructions, which, when executed by the at least one hardware processor, cause the network node to perform a process for limiting network bandwidth usage of wireless devices based on network service priorities, the process comprising:
   during a network registration of a wireless device with the telecommunication network via the network node, receiving device capability information of the wireless device from the wireless device,
   wherein the device capability information indicates that the wireless device is capable of using bandwidth parts (BWPs) of a channel bandwidth for the telecommunication network;
   in response to a determination by a core network of the telecommunication network that the wireless device is assigned with a secondary service-priority level below a primary service-priority level, receiving a network policy for the wireless device, the network policy specifying one or more BWPs of the channel bandwidth to be used by the wireless device on the telecommunication network; and transmitting, to the wireless device, a radio resource configuration (RRC) message to configure the wireless device to use the one or more BWPs on the telecommunication network according to the network policy.

2. The network node of claim 1, wherein the process performed by the network node further comprises:

transmitting, to a second wireless device that is assigned with the primary service-priority level, a RRC message that permits the second wireless device to use a full channel bandwidth on the telecommunication network.

3. The network node of claim 1, wherein the wireless device is assigned with the secondary service-priority level based on the wireless device being associated with a roaming network subscriber or a subscriber of a mobile virtual network operator (MVNO) of the telecommunication network.

4. The network node of claim 1, wherein the process performed by the network node further comprises:

receiving an updated network policy that is determined based on current network usage of the telecommunication network, the updated network policy specifying an increased number of BWPs of the channel bandwidth or a full channel bandwidth; and transmitting a RRC re-configuration message to re-configure the wireless device according to the updated network policy.

5. A method for a telecommunication network, the method comprising:

in connection with a network registration for a wireless device with the telecommunication network, determining, by a first network function, that the wireless device is assigned with a secondary service-priority level below a primary service-priority level based on network subscriber information associated with the wireless device;

obtaining, by the first network function from a second network function, a policy that specifies a limited channel bandwidth for the wireless device to access the telecommunication network, the limited channel bandwidth corresponding to the secondary service-priority level assigned to the wireless device, wherein the limited channel bandwidth is less than a full channel bandwidth of a channel provided between a network node of the telecommunication network and the wireless device; and transmitting, from the first network function, the policy to the network node of the telecommunication network to which the wireless device is communicably coupled to cause the network node to configure the wireless device to use the limited channel bandwidth.

6. The method of claim 5, wherein determining that the wireless device is assigned with the secondary service-priority level is based on the network subscriber information indicating that the wireless device is associated with a roaming subscriber having a home network that is not the telecommunication network.

7. The method of claim 6, wherein the limited channel bandwidth is determined by the second network function using roaming service parameters for the wireless device, the roaming service parameters obtained from the home network of the wireless device.

8. The method of claim 5, wherein the first network function determines that the wireless device is assigned with the secondary service-priority level further based on the wireless device being assigned to a network slice of the telecommunication network that is associated with a lower priority than another network slice.

9. The method of claim 5, wherein determining that the wireless device is assigned with the secondary service-priority level comprises determining that the wireless device is at least one of an Internet of Things (IoT) device, a wearable device, or a messaging device.

10. The method of claim 5, further comprising:

during a network registration of the wireless device with the telecommunication network, receiving device capability information of the wireless device that indicates that the wireless device is capable of using subdivisions of the channel provided between the network node and the wireless device, wherein the limited channel bandwidth specified by the policy is defined with respect to the subdivisions of the channel.

11. The method of claim 5, further comprising:

determining to permit increased bandwidth usage by wireless devices associated with the secondary service-priority level in accordance with a current state of the telecommunication network; and transmitting, to a network node to which the wireless device is currently coupled, an updated policy that specifies a second channel bandwidth to cause the network node to re-configure the wireless device according to the updated policy, the second channel bandwidth being larger than the limited channel bandwidth.

12. The method of claim 5, wherein the policy further specifies a bitrate throughput for data traffic associated with the wireless device, the bitrate throughput corresponding to the secondary service-priority level assigned to the wireless device.

13. A system for a telecommunication network, the system comprising:

a first network function configured to:

query for a network policy that specifies a channel bandwidth for a wireless device, and obtain and transmit the network policy to a network node of the telecommunication network to which the wireless device is communicably coupled, to cause the wireless device to use the channel bandwidth specified in the network policy;

a second network function configured to:

determine the channel bandwidth specified in the network policy for the wireless device according to a service-priority level assigned to the wireless device, and provide the network policy including the channel bandwidth to the first network function; and a third network function configured to:

in connection with a network registration of the wireless device, determine the service-priority level of the wireless device, wherein the service-priority level of the wireless device is provided from the third network function to the second network function via the first network function.

14. The system of claim 13, wherein the first network function is configured to query for the network policy based on obtaining, during the network registration of the wireless device, device capability information that indicates that the wireless device is capable of using subdivisions of a full channel bandwidth, and wherein the channel bandwidth specified in the network policy is a limited channel bandwidth defined with respect to the subdivisions of the full channel bandwidth.

15. The system of claim 13, wherein the third network function is configured to determine a secondary level as the service-priority level of the wireless device based on the wireless device being associated with a roaming subscriber having a home network that is not the telecommunication network, wherein the second network function is configured to determine a limited channel bandwidth as the channel bandwidth specified in the network policy according to the secondary level.

16. The system of claim 13, wherein the first network function is a session management function (SMF), the second network function is a policy control function (PCF), the third network function is a unified data management (UDM).

17. The system of claim 16, wherein the first network function transmits the network policy to the network node via a fourth network function that is an access and mobility management function (AMF).

18. The system of claim 13, wherein the third network function determines the service-priority level of the wireless device based on a device type of the wireless device.

19. The system of claim 13, wherein the service-priority level assigned to the wireless device corresponds to a network slice of the telecommunication network to which the wireless device belongs.

20. The system of claim 13, wherein the network policy further specifies a bitrate throughput for the wireless device that corresponds to the service-priority level assigned to the wireless device.

* * * * *